United States Patent
Wang et al.

(10) Patent No.: US 11,818,424 B2
(45) Date of Patent: Nov. 14, 2023

(54) METHOD AND APPARATUS FOR GENERATING VIDEO, ELECTRONIC DEVICE, AND COMPUTER READABLE MEDIUM

(71) Applicant: BEIJING BYTEDANCE NETWORK TECHNOLOGY CO., LTD., Beijing (CN)

(72) Inventors: Ya Wang, Beijing (CN); Pingfei Fu, Beijing (CN); Wei Jiang, Beijing (CN); Qifan Zheng, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/744,474

(22) Filed: May 13, 2022

(65) Prior Publication Data

US 2022/0279239 A1  Sep. 1, 2022

Related U.S. Application Data

(63) Continuation of application No. PCT/CN2020/127886, filed on Nov. 10, 2020.

(30) Foreign Application Priority Data

Nov. 15, 2019 (CN) .......................... 201911118901.X

(51) Int. Cl.
*H04N 21/439* (2011.01)
*G06F 3/0484* (2022.01)
(Continued)

(52) U.S. Cl.
CPC ....... *H04N 21/4394* (2013.01); *G06F 16/683* (2019.01); *G06F 16/686* (2019.01); *G06F 16/7834* (2019.01)

(58) Field of Classification Search
CPC ............ H04N 21/4394; G06F 16/7834; G06F 16/7837; G06F 3/0482; G06F 3/04842; G11B 27/031
See application file for complete search history.

(56) References Cited

U.S. PATENT DOCUMENTS

2015/0220249 A1* 8/2015 Snibbe .................. G06F 3/0412
715/719
2016/0249093 A1   8/2016 Stojancic et al.
(Continued)

FOREIGN PATENT DOCUMENTS

CN   107393569 A   11/2017
CN   108600825 A   9/2018
(Continued)

OTHER PUBLICATIONS

International Patent Application No. PCT/CN2020/127886; Int'l Written Opinion and Search Report; dated Feb. 19, 2021; 7 pages.
(Continued)

*Primary Examiner* — Thomas H Maung
(74) *Attorney, Agent, or Firm* — BakerHostetler

(57) ABSTRACT

Disclosed in the embodiments of the present disclosure are a method and apparatus used for generating a video, and an electronic device. The method comprises: while displaying an original video, acquiring audio material by means of background music of the original video, and acquiring image material, determining music points of the audio material, the music points being used for dividing the audio material into a plurality of audio clips; using the image material to generate a video clip for each music clip in the audio material so as to obtain a plurality of video clips, corresponding music clips and video clips having the same duration; and according to the times at which the music clips corresponding to the plurality of video clips appear in the
(Continued)

audio material, splicing the plurality of video clips together, and adding the audio material as a video audio track to obtain a synthesized video.

16 Claims, 12 Drawing Sheets

(51) Int. Cl.
*G06F 16/783* (2019.01)
*G06F 16/683* (2019.01)
*G06F 16/68* (2019.01)

(56) References Cited

U.S. PATENT DOCUMENTS

| | | | |
|---|---|---|---|
| 2017/0062006 A1* | 3/2017 | Plom | G11B 27/28 |
| 2020/0013380 A1* | 1/2020 | Kakoyiannis | G06F 16/685 |
| 2021/0012761 A1* | 1/2021 | Song | G06F 16/683 |

FOREIGN PATENT DOCUMENTS

| | | |
|---|---|---|
| CN | 108616696 A | 10/2018 |
| CN | 108900768 A | 11/2018 |
| CN | 108965706 A | 12/2018 |
| CN | 109257545 A | 1/2019 |
| CN | 109451245 A | 3/2019 |
| CN | 109922268 A | 6/2019 |
| CN | 110233976 A | 9/2019 |
| CN | 110265057 A | 9/2019 |
| CN | 110278388 A | 9/2019 |
| CN | 110324718 A | 10/2019 |
| CN | 110336960 A | 10/2019 |
| CN | 110392281 A | 10/2019 |
| WO | WO 2008/024486 A2 | 2/2008 |

OTHER PUBLICATIONS

European Patent Application No. 20888628.3; Extended Search Report; dated Nov. 8, 2022; 9 pages.

Fan et al.; "DJ-MVP: An Automatic Music Video Producer"; Advances in Computer Entertainment Technology; Nov. 2016; 8 pages.

* cited by examiner

200

```
┌─────────────────────────────────┐
│ during a display process of an  │
│ original video, acquiring an    │
│ audio material through a        │──── 201
│ background music of the         │
│ original video, and acquiring   │
│ an image material               │
└─────────────────────────────────┘
                │
                ▼
┌─────────────────────────────────┐
│ determining music points for    │
│ the audio material, the music   │
│ points being used to divide     │──── 202
│ the audio material into a       │
│ plurality of audio clips        │
└─────────────────────────────────┘
                │
                ▼
┌─────────────────────────────────┐
│ generating one video clip for   │
│ each music clip in the audio    │
│ material using the image        │
│ material so as to obtain a      │──── 203
│ plurality of video clips,       │
│ wherein a music clip and a      │
│ video clip, which correspond    │
│ to each other, have a same      │
│ duration                        │
└─────────────────────────────────┘
                │
                ▼
┌─────────────────────────────────┐
│ splicing the plurality of video │
│ clips together according to     │
│ times when music clips          │
│ respectively corresponding to   │
│ the plurality of video clips    │──── 204
│ appear in the audio material,   │
│ and adding the audio material   │
│ as a video audio track to       │
│ obtain a synthesized video      │
└─────────────────────────────────┘
```

FIG. 2

METHOD AND APPARATUS FOR GENERATING VIDEO, ELECTRONIC DEVICE, AND COMPUTER READABLE MEDIUM

PARTIES TO A JOINT RESEARCH AGREEMENT

The present disclosure was made by or on behalf of the below listed parties to a joint research agreement that was in effect on or before the effective filing date of the present disclosure. The present disclosure was made as a result of activities undertaken within the scope of the joint research agreement. The parties to the joint research agreement are BEIJING ZITIAO NETWORK TECHNOLOGY CO., LTD., BEIJING MICROLIVE VISION TECHNOLOGY CO., LTD, and TIANJIN JINGZHUNHUDONG TECHNOLOGY CO., LTD.

CROSS-REFERENCE TO RELATED APPLICATIONS

The present disclosure is a continuation of International Patent Application No. PCT/CN2020/127886, filed on Nov. 10, 2020, which claims priority of the Chinese patent application No. 201911118901.X, entitled "Method and Apparatus for Generating Video, Electronic Device, and Computer Readable Medium" filed to China National Intellectual Property Administration on Nov. 15, 2019, both of which are incorporated herein by reference in their entireties.

TECHNICAL FIELD

The embodiments of the present disclosure relate to the technical field of computers, in particular to a method and apparatus for generating a video, an electronic device, and a computer readable medium.

BACKGROUND

With the progress of science and technology and the popularity of the Internet, more and more people transmit information and share life fragments through videos. Meanwhile, the video processing technology is also making rapid progress. As a common software on the terminals, the video processing software has been widely used in various scenes. In many cases, users often need to clip and make a video using a video, a music and other material.

However, at present, users often need to spend a lot of energy and time dealing with various material when editing videos with the video software. It can be seen that the current video editing methods are not simple enough for users.

SUMMARY

The summary of the present disclosure is used to introduce ideas in a brief form, and these ideas are described in detail in the following detailed description. The summary is not intended to identify key features or essential features of the claimed technical solutions, nor is it intended to limit the scope of the claimed technical solutions.

Some embodiments of the present disclosure aim to propose an improved method, apparatus, electronic device and computer readable medium for generating a video to solve the technical problems mentioned in the background section above.

In the first aspect, some embodiments of the present disclosure disclose a method for generating a video, the method including: during a display process of an original video, acquiring an audio material through a background music of the original video, and acquiring an image material; determining music points for the audio material, the music points being used to divide the audio material into a plurality of audio clips; generating one video clip for each music clip in the audio material using the image material so as to obtain a plurality of video clips, a music clip and a video clip, which correspond to each other, having a same duration; and splicing the plurality of video clips together according to times when music clips respectively corresponding to the plurality of video clips appear in the audio material, and adding the audio material as a video audio track to obtain a synthesized video.

In the second aspect, some embodiments of the present disclosure provide an apparatus for generating a video, and the apparatus includes: an acquisition unit, a determination unit, a generating unit, and a synthesizing unit. The acquisition unit is configured to, during a display process of an original video, acquire an audio material through a background music of the original video, and acquire an image material. The determination unit is configured to determine music points for the audio material, and the music points are used to divide the audio material into a plurality of audio clips. The generating unit is configured to generate one video clip for each music clip in the audio material using the image material so as to obtain a plurality of video clips, and a music clip and a video clip, which correspond to each other, have a same duration. The synthesizing unit is configured to splice the plurality of video clips together according to times at which music clips respectively corresponding to the plurality of video clips appear in the audio material, and add the audio material as a video audio track to obtain a synthesized video.

In the third aspect, some embodiments of the present disclosure provide an electronic device, which includes: one or more processors, and a storage apparatus having one or more programs stored thereon. In a case where the one or more programs are executed by the one or more processors, the one or more processors execute any one of the methods according to the first aspect.

In the fourth aspect, some embodiments of the present disclosure provide a computer readable medium, having a computer program stored thereon. In a case where the computer program is executed by a processor, any one of the methods according to the first aspect is implemented.

In the fifth aspect, some embodiments of the present disclosure provide a computer program, which includes a program code. In a case where the computer program is executed by a computer, the computer program executes any one of the methods according to the first aspect.

One of the above-mentioned embodiments of the present disclosure has the following beneficial effects: a plurality of audio clips can be obtained by dividing the music points, thus generating a plurality of video clips in the synthesized video, reducing the duration for users to process material, and enabling the editing to be easier. Furthermore, the method provided by the present disclosure is helpful for users to shoot videos by using the audio material currently used for playing videos, saving user operations, improving the convenience for selecting the background music during performing the video shooting, and improving user experience.

BRIEF DESCRIPTION OF THE DRAWINGS

The above and other features, advantages and aspects of various embodiments of the present disclosure become more apparent when taken in conjunction with the accompanying drawings and with reference to the following detailed descriptions. Throughout the drawings, the same or similar reference numerals refer to the same or similar elements. It should be understood that the drawings are schematic and the originals and elements are not necessarily drawn to scale.

FIG. 2 is a flowchart of some embodiments of the method for generating a video according to the present disclosure.

DETAILED DESCRIPTION

Figure 1A:
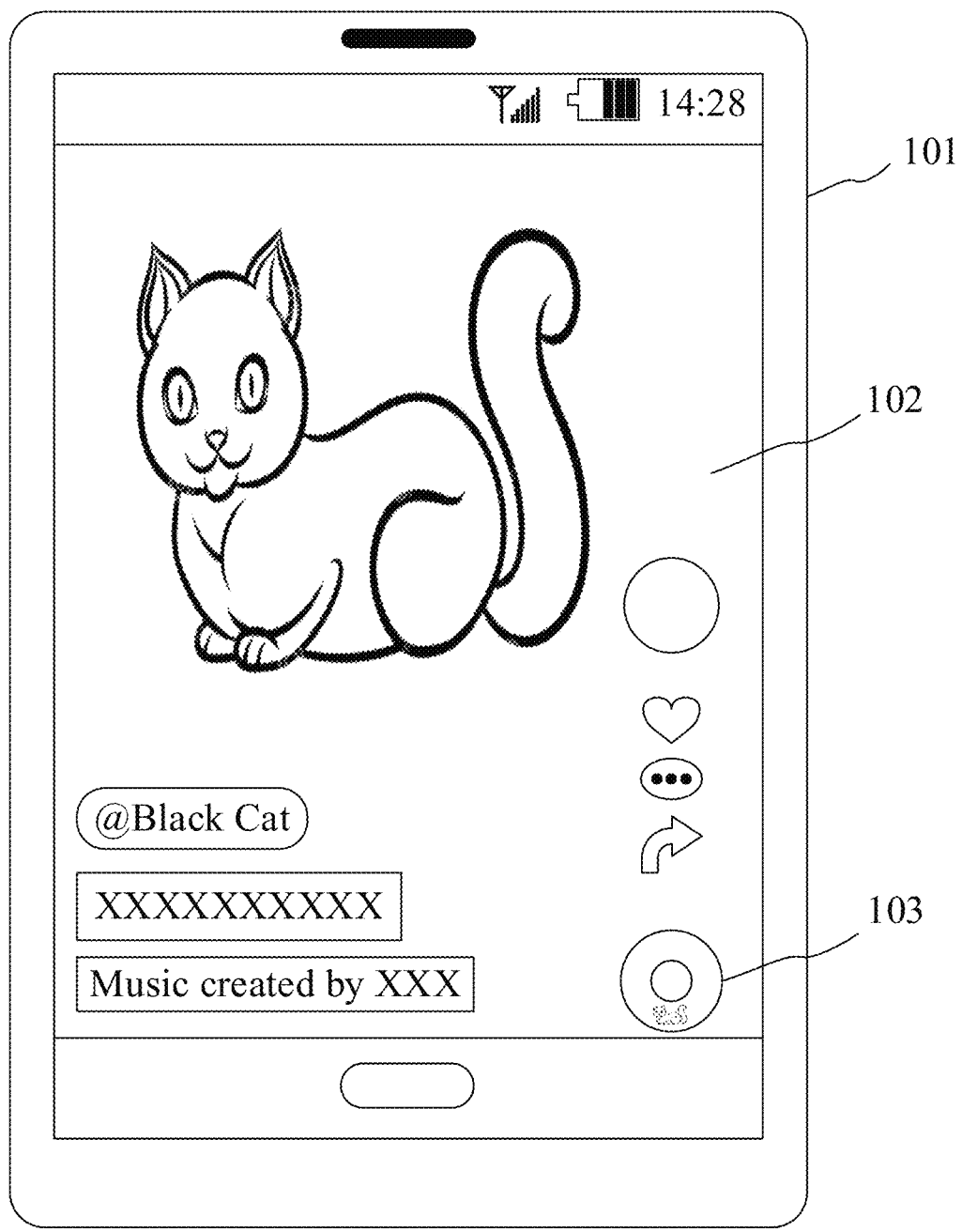
FIGS. 1A-1G are schematic diagrams of an application scenario of a method for generating a video in some embodiments of the present disclosure.

The embodiments of the present disclosure will be described in more detail below with reference to the accompanying drawings. While certain embodiments of the present disclosure are illustrated in the drawings, it should be understood that, the present disclosure may be implemented in various forms and should not be construed as limited to the embodiments set forth herein. In contrast, these embodiments are provided for a thorough and complete understanding of the present disclosure. It should be understood that, the drawings and the embodiments of the present disclosure are only for exemplary purposes, and are not intended to limit the protection scope of the present disclosure.

In addition, it should be noted that, for convenience of description, only the parts related to the relevant invention are illustrated in the drawings. The embodiments of the present disclosure and features of the embodiments may be combined with each other without conflict.

It should be noted that, concepts such as "first" and "second" as mentioned in the present disclosure are only used to distinguish different apparatuses, modules or units, and are not used to limit orders of functions executed by these apparatuses, modules or units or interdependence thereof.

It should be noted that, modifications of "a" and "a plurality" as mentioned in the present disclosure are exemplary rather than limitative; and those skilled in the art should understand that, unless otherwise clearly indicated in the context, they should be understood as "one or more".

The names of messages or information exchanged between a plurality of apparatuses according to the implementation modes of the present disclosure are only for exemplary purposes, and are not intended to limit the protection scope of these messages or information.

The present disclosure will be described in detail below with reference to the accompanying drawings and in conjunction with the embodiments.

Figure 1B:
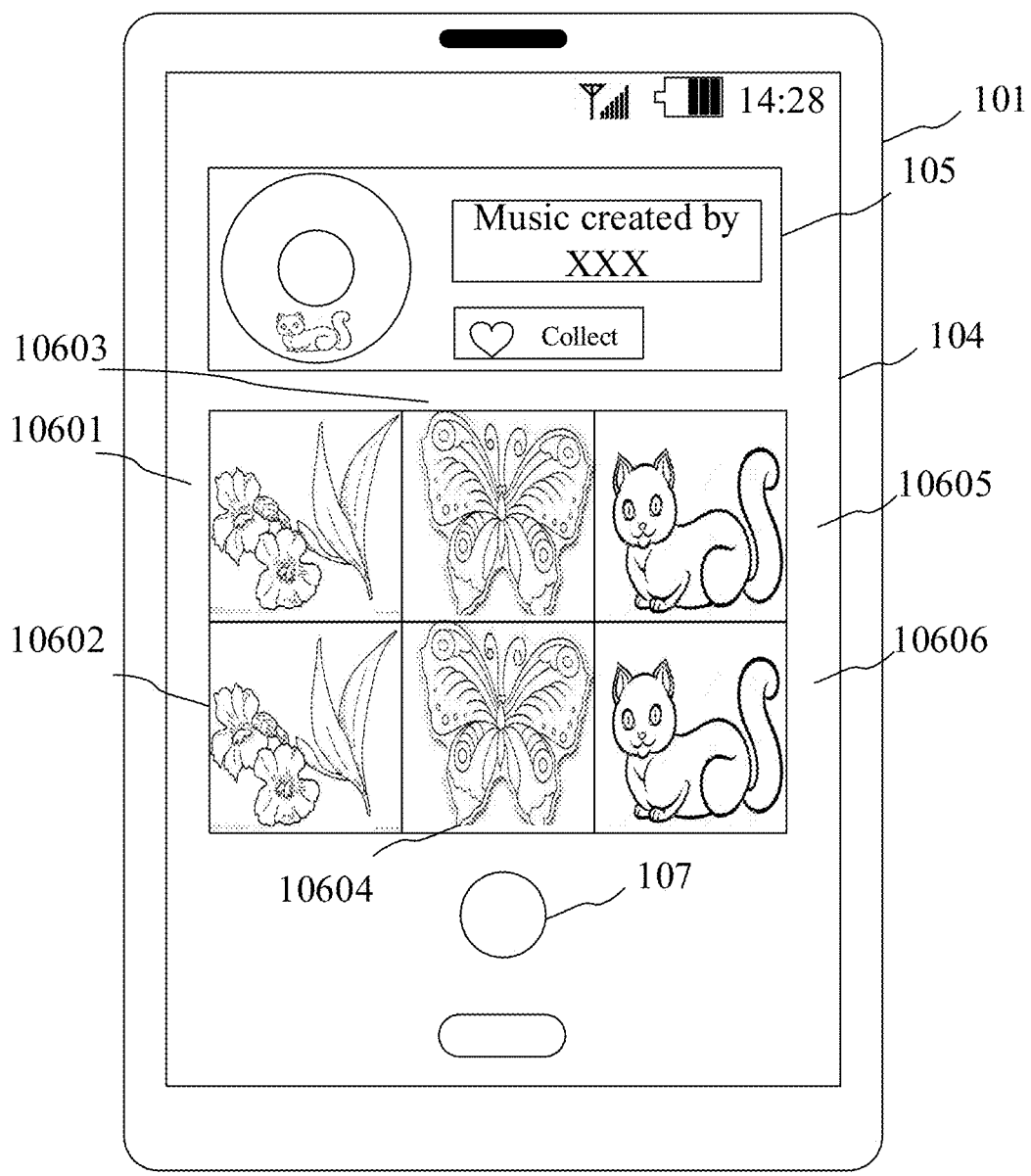
Figure 1C:
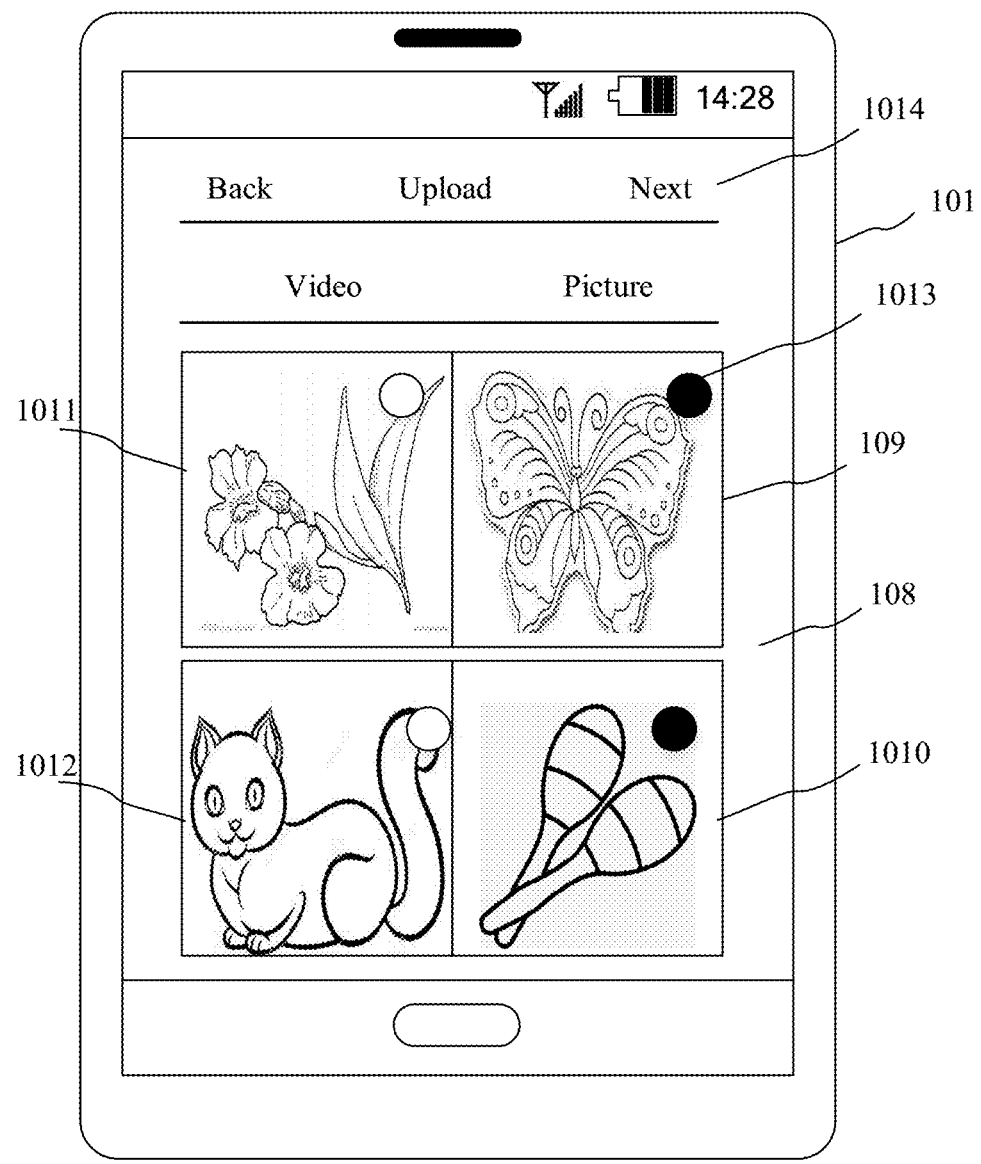

FIGS. 1A-1C are a plurality of schematic diagrams of application scenarios of a method for generating a video in some embodiments of the present disclosure. As illustrated in the application scenario of FIG. 1A, a user can watch a video through a display interface 102 on a terminal device 101, or click a background music identifier 103 for the video on the display interface 102 to obtain a background music of the video. Then a display interface 104 as illustrated in FIG. 1B is skipped to be displayed, the display interface 104 includes a music detail interface 105, videos 10601-10606 with the same music and a production button 107. In the case where the user clicks the production button 107, an upload interface 108 as illustrated in FIG. 1C is skipped to be displayed, and the user can select multiple image material on the upload interface 108.

Figure 1D:
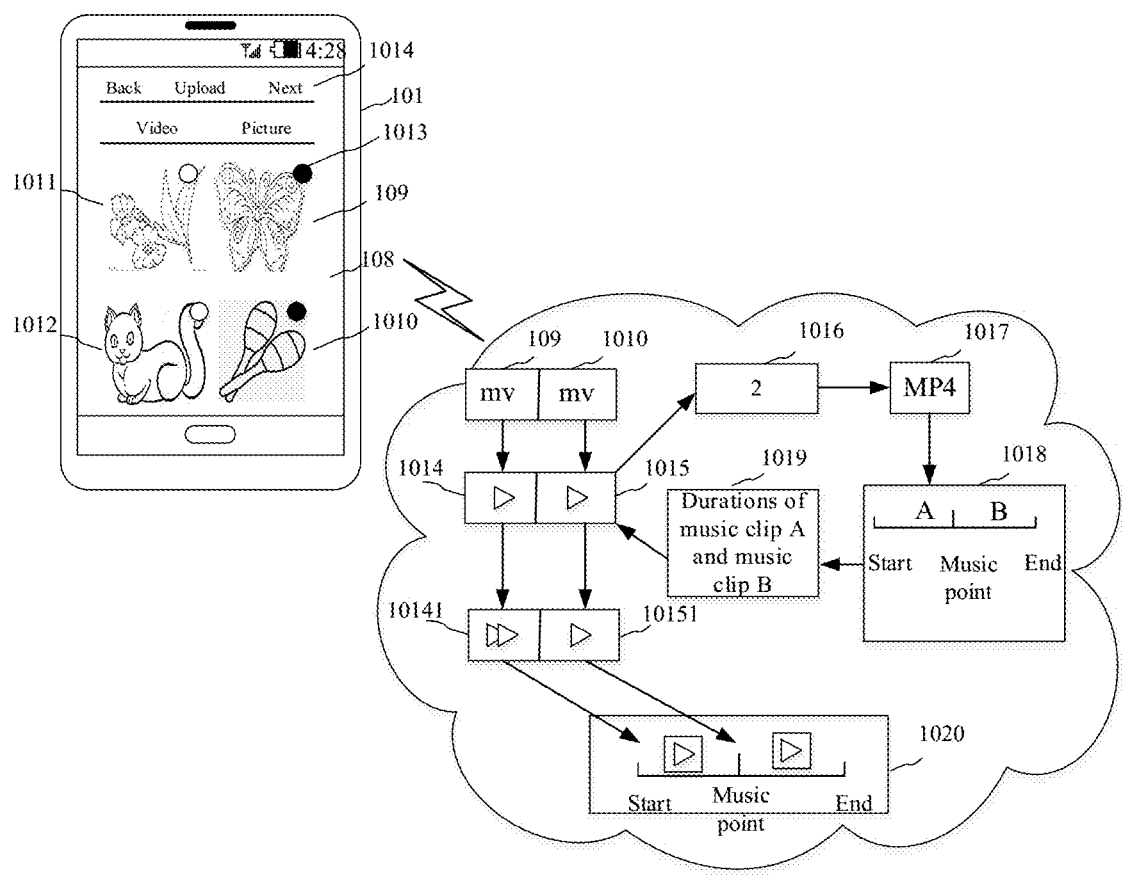

For example, as illustrated in FIG. 1D, an image material 109, an image material 1010, an image material 1011, and an image material 1012 are illustrated in the upload interface 108. The user clicks a selection box 1013 to select the image material 109 and the image material 1010. The user clicks a "next step" button 1014, and the terminal device 101 generates an image material 1014 and an image material 1015 based on the selected image material 109 and image material 1010, respectively. According to the number of the acquired image material (illustrated as 2 in the figure), the background music for the above acquired video is taken as an audio material 1017, and a music point 1018 in the audio material 1017 is determined. The audio material 1017 is divided into a music clip A and a music clip B according to the music point 1018. The image material 1014 and the image material 1015 are respectively processed according to the durations of the obtained music clip A and the music clip B. The corresponding video clips 10141 and 10151 are obtained. The video clips 10141 and 10151 are spliced according to the times when the music clip A and the music clip B appear in the audio material 1017, and the audio material 1017 is added as an audio track of the spliced video to obtain the synthesized video 1020.

Figure 1E:
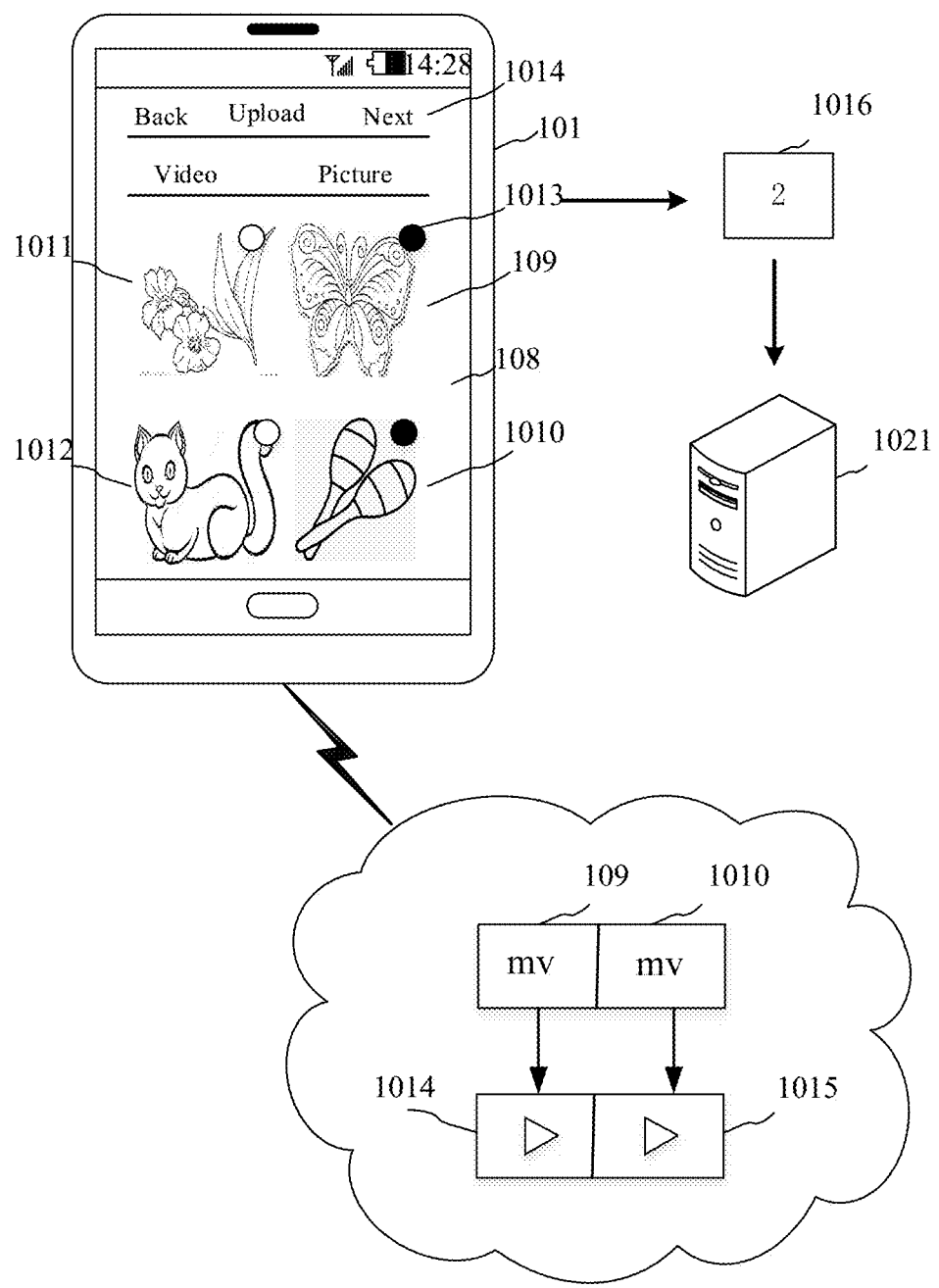
Figure 1F:
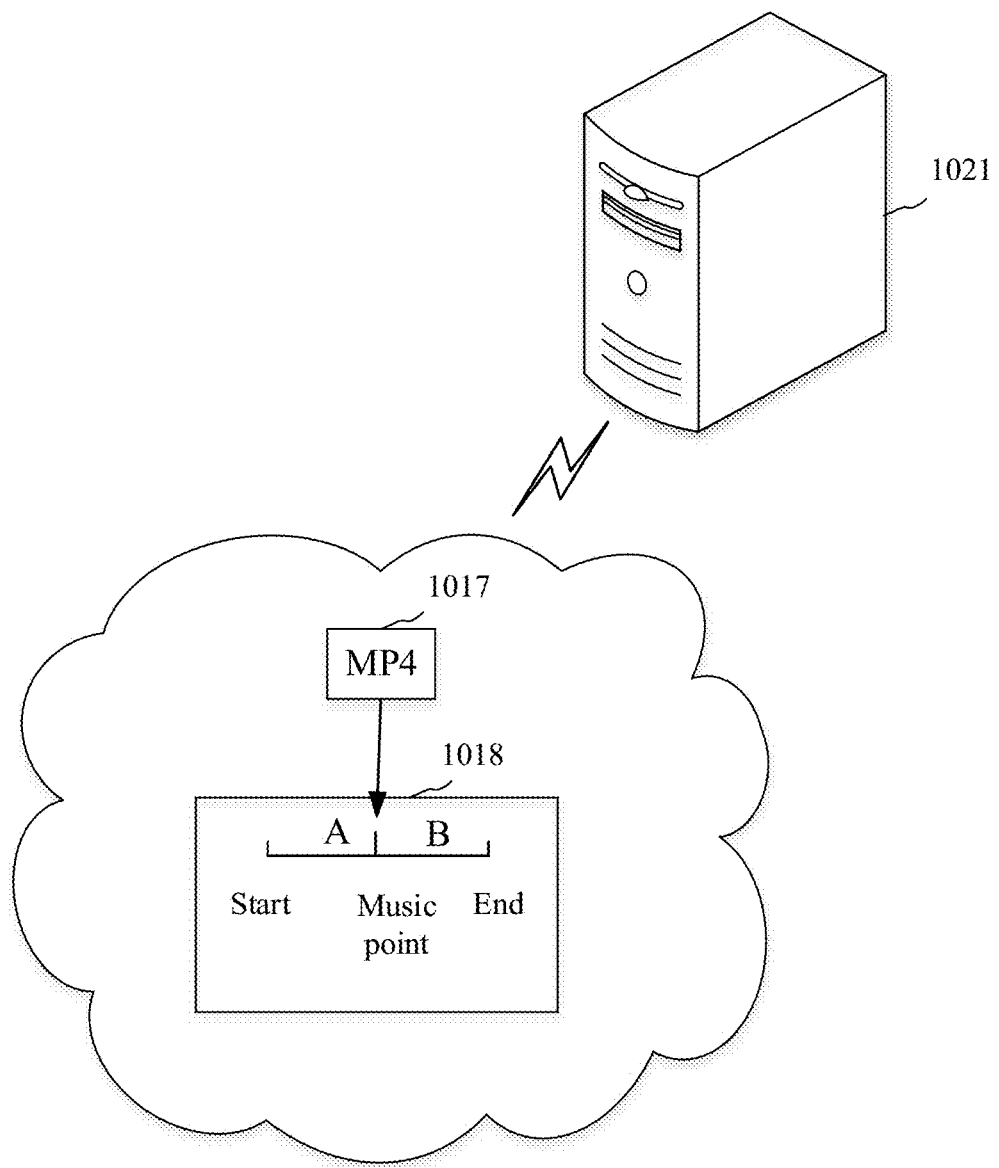
Figure 1G:
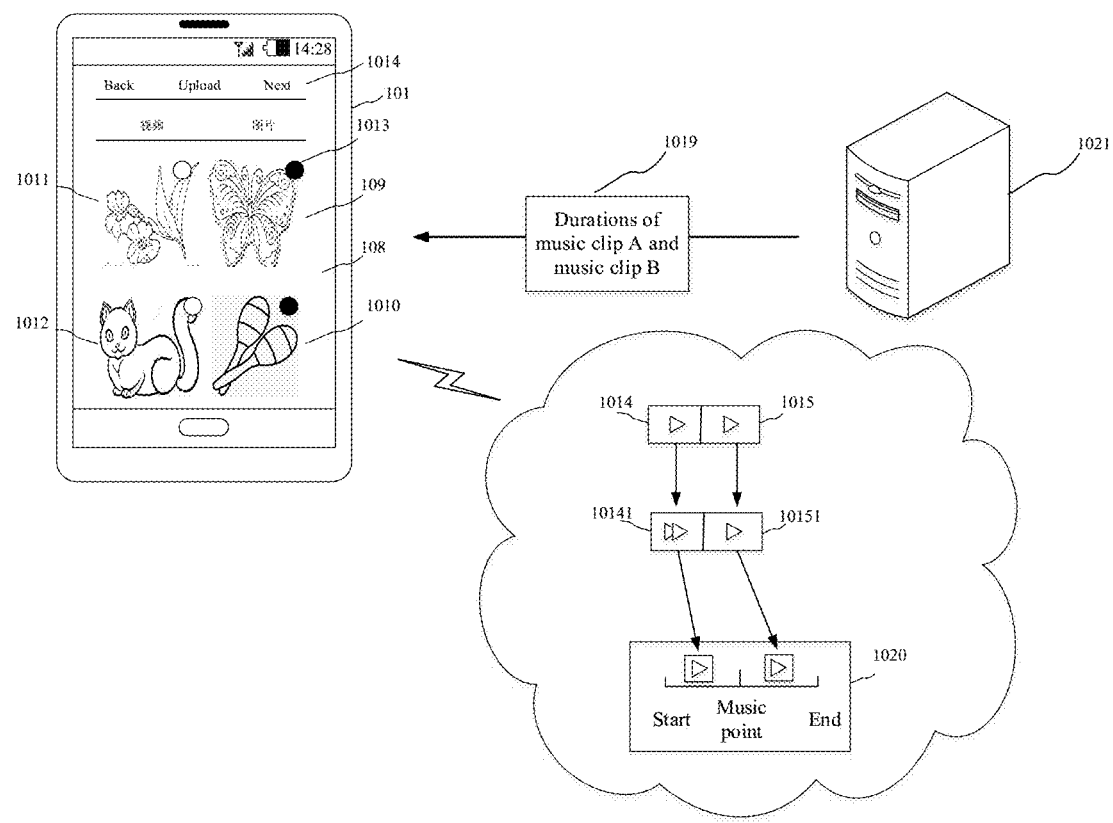

Different from FIG. 1D, as illustrated in the application scenarios of FIGS. 1E-1G, the above terminal device 101 transmits image information 1016 including the number of image material (illustrated as 2 in the figure) to a server 1021. In FIG. 1E, the server 1021 determines the music point 1018 in the audio material 1017 according to the acquired audio material 1017. The audio material 1017 is divided into the music clip A and the music clip B according to the music point 1018. In FIG. 1E, the server 1021 transmits the information 1019 including the durations of the music clip A and music clip B to the above terminal device 101. The above terminal device 101 processes the image material 1014 and the image material 1015 according to the durations of the music clip A and the music clip B, respectively, so as to obtain corresponding video clip 10141 and video clip 10151. The duration of the video clip 10141 is equal to the duration of the music clip A, and the duration of the video clip 10151 is equal to the duration of the music clip B. The terminal device 101 splices the video clip 10141 and the video clip 10151 according to the times when the music clip A and the music clip B appear in the audio material 1017, and adds the audio material 1017 as the audio track of the spliced video to obtain the synthesized video 1020.

It can be understood that the method for generating a video can be executed by the terminal device 101, or by the server 1021, or by various software programs. The terminal device 101 can be, for example, various electronic devices with display screens, including but not limited to smart phones, tablet computers, e-book readers, laptop computers, desktop computers, and the like. In addition, the executive body may also be embodied as the server 1021, a software, etc. When the executive body is the software, it can be installed in the electronic devices listed above. The software can be implemented, for example, as multiple software or software modules for providing distributed services, or as a single software or software module. There is no specific limitation here.

It should be understood that the numbers of mobile phones and servers in FIGS. 1A-1G are only schematic. There can be any number of mobile phones and servers according to the implementation requirements.

With continued reference to FIG. 2, the flow 200 of some embodiments of the method for generating a video according to the present disclosure is illustrated. The method for generating a video comprises the following steps:

Step 201, during a display process of an original video, acquiring an audio material through a background music of the original video, and acquiring an image material.

In some embodiments, the executive body (e.g., the server 1021 illustrated in FIG. 1E) of the method for generating a video can acquire the audio material through the background music of the original video by different ways in the display process of the original video through wired connection or wireless connection. For example, the executive body can acquire the background music of the original video as the audio material during the display process of the original video. For example, the executive body can acquire the background music of the original video during the display process of the original video, and then clip the background music, and take the clipped music as the audio material. It can be understood that in the case where the original video is a video shot by the user using the music provided by the present disclosure as the background music, the executive body (for example, the server 1021 illustrated in FIG. 1E) can obtain the background music from a music library provided by the present disclosure, so that the audio material can be obtained through the obtained background music. In the case where the original video is a video shot by the user without using the music provided by the present disclosure as the background music, the executive body separates the audio from the original video to obtain the background music, and then obtains the audio material through the separated background music. The executive body can obtain the image material according to the user's video selection operation, and can also use the video or picture taken by the user as the image material. Here, the image material may include at least one of the following: a video material and a picture material.

In some alternative implementations of some embodiments, during the display process of the original video, acquiring the background music of the original video as the audio material, comprises: displaying a playing interface for the original video; and acquiring the background music of the original video as the audio material in response to detecting a first user operation on the playing interface. Here, the first user operation may be a click operation on the identifier used to indicate the background music in the playing interface of the original video. For example, as illustrated in FIG. 1A, the first user operation may be clicking on the background music identifier 103 for the video on the display interface 102.

In some alternative implementations of some embodiments, acquiring the image material comprises: displaying a first display interface for the background music in response to detecting the first user operation on the playing interface; displaying the second display interface for the image material in response to detecting a second user operation on the first display interface; and acquiring the image material based on a selection operation for the image material on the second display interface. Here, the first display interface may be a display interface with the content of the above background music and a video list made using the above background music. The second user operation may be a click operation on the identifier used to indicate the video production in the first display interface. The second display interface can be an interface with videos/pictures to be selected. For example, the second user operation may be a click operation on the production button 107 in the first display interface (such as FIG. 1B).

For example, the user clicks the production button on the first display interface to display the second display interface, and then checks the video or picture displayed on the second display interface.

For example, in the process of video playing, the user can click on the identifier of the background music to enter the music display interface, and meanwhile, the background music of the currently playing video can be obtained as the audio material. The user can click on the identifier used to indicate the production of the same video so as to enter the interface of image material selection. The video or picture to be selected on the above interface is checked to obtain the image material used for making the same video.

As an example, as illustrated in FIG. 1A, the user clicks the background music identifier 103 for the video in the display interface 102 so as to skip to the first display interface (FIG. 1B). In response to the click operation by the user for the production button 107 on the first display interface, the second display interface (as illustrated in FIG. 1C) is skipped to be displayed.

In some alternative implementations of some embodiments, displaying the second display interface for the image material in response to detecting the second user operation on the first display interface, comprises: displaying an image shooting interface in response to detecting the second user operation on the first display interface; and displaying the second display interface for the image material in response to detecting the third user operation on the second control. The image shooting interface comprises a first control and a second control, the first control is used to trigger an image shooting, and the second control is used to trigger an image selection. Here, the second display interface can be an image shooting interface with at least two controls. Specifically, the first control can be an image shooting control, and the second control can be an image selection control. Here, the third user operation may be a click operation on the second control.

For example, the user clicks the video production on the above-mentioned first display interface to display the image shooting interface. The user can click the first control (which is used to trigger the image shooting) to shoot videos or pictures. The user can also click the second control (which is used to trigger the image selection) to display the second display interface and display the image material for the user to select. Here, the image material selected by the user can be the image material in the local material library of the user's equipment or the image material on the network.

Figure 2A:
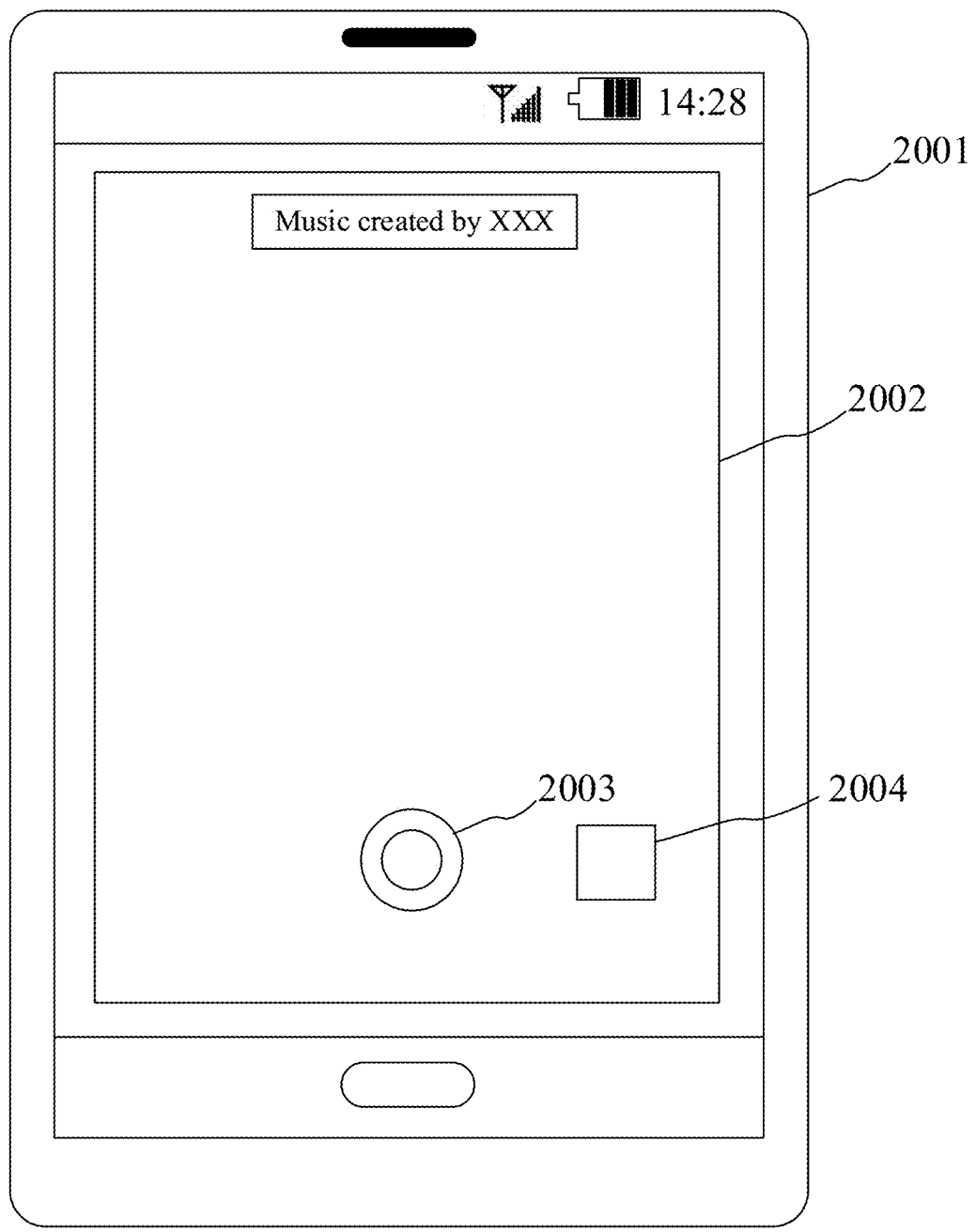
FIG. 2A is a schematic diagram of an application scenario for an image shooting interface.
Figure 2B:
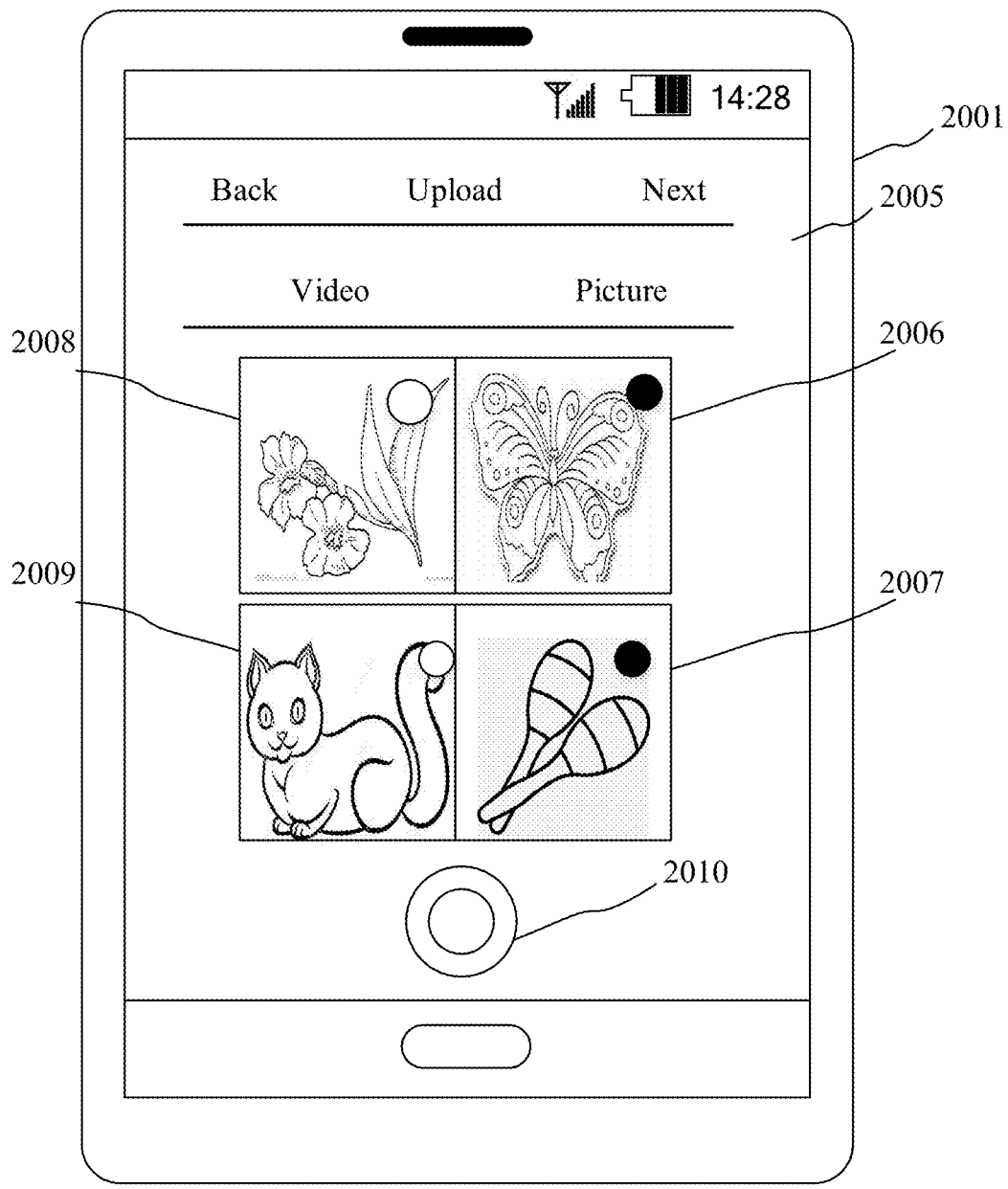
FIG. 2B is a schematic diagram of an application scenario for a second display interface.

For example, as illustrated in FIG. 2A, on the image shooting interface 2002 displayed on the terminal device 2001, the user can click the first control 2003 (which is used to trigger the image shooting) to shoot videos or pictures. The user can also click the second control 2004 (which is used to trigger the image selection). Then the second display interface 2005 as illustrated in FIG. 2B is skipped to be displayed, the user can check the displayed image material 2006-2009. Then the user can click the production button 2010 to make a video.

In some alternative implementations of some embodiments, acquiring the image material comprises: displaying a first display interface for the background music in response to detecting the first user operation on the playing interface; displaying an image shooting interface in response to detecting a second user operation on the first display interface; and in response to detecting a fourth user operation on the first control, calling a shooting element to shoot an image so as to obtain the image material. The image shooting interface comprises the first control, and the first control is used to trigger an image shooting. Here, the fourth user operation can be the trigger operation for the first control.

In some alternative implementations of some embodiments, during the display process of the original video, acquiring the audio material through the background music of the original video, comprises: displaying a playing interface for the original video; displaying a display interface for the background music of the original video in response to detecting a fifth user operation on the playing interface; clipping the background music in response to detecting a sixth user operation on the display interface; and determining a material clipped from the background music as the audio material. The display interface comprises the third control and the fourth control, the third control is used to trigger a music manual clipping, and the fourth control is used to trigger a music automatic clipping.

Here, the fifth user operation may be a click operation on the identifier used to indicate the background music in the playing interface of the original video. The display interface for the background music can be a display interface with the content of the background music, the third control, and the fourth control. The sixth user operation may be an operation for triggering the music clipping. The seventh user operation can be a user operation for the third control or a user operation for the fourth control.

In some alternative implementations of some embodiments, clipping the background music in response to detecting the sixth user operation on the display interface, comprises: in the case where the seventh user operation is a user operation for the third control, displaying an operation interface for an music clipping; determining a clipping interval selected by a manual clipping operation from the background music in response to detecting the manual clipping operation for the background music on the operation interface for the music clipping; and clipping the background music according to the clipping interval. The third control is used to trigger the music manual clipping.

Here, the seventh user operation may be a trigger operation for triggering the third control. The above-mentioned operation interface for the music clipping includes, but is not limited to, at least one of the following: a music timeline, music points, and a music duration. The manual clipping operation can be the selection and clipping for the music points and the music duration on the music timeline.

As an example, the user clicks on the music manual clipping to display the operation interface for the music clipping. The user can manually slide left/right to determine the clipping interval. Then the background music is clipped according to the clipping interval.

In some alternative implementations of some embodiments, clipping the background music comprises: in the case where a seventh user operation is a user operation for the fourth control, analyzing a clipping interval in the background music which is applicable for being used as the audio material according to an analysis algorithm for the audio material; and clipping the background music according to the clipping interval.

Here, the seventh user operation may be a trigger operation for triggering the fourth control. The clipping interval according to the audio material can be determined by inputting the background music into a pre-trained machine learning model so as to obtain the interval with the largest score value; and determining the interval as the clipping interval for the audio material.

Step 202, determining music points for the audio material, the music points being used to divide the audio material into a plurality of audio clips.

In some embodiments, the executive body may first determine a candidate music point for the audio material. Here, the candidate music point may be a point in the audio material where the preset beat change condition is satisfied. Then, the executive body can select a target number of music points from the obtained candidate music points. The target number can be determined according to the number of acquired image material, or the number of strong beats in the audio materials, or the number set by the user. As an example, in the case where 10 image material are acquired, 9 music points can be determined. The strong beat is usually a beat with strong musical strength.

As an example, the candidate music point is a position in the audio material where the preset musicality is changed. The position where the musicality is changed may include the position where the beat is changed and the position where the melody is changed. Based on this case, the candidate music point may be determined in the mode below: the executive body may analyze the audio material, and determine the beat point and a musical note starting point therein. The beat point is the position where the beat is changed, and the musical note starting point is the position where the melody is changed. Specifically, on the one hand, a beat analysis algorithm based on deep learning may be used to analyze the audio material to obtain the beat point in the audio material and a timestamp where the beat point is located; on the other hand, a short-term spectrum analysis is performed on the audio material to obtain the musical note starting point in the audio material and a timestamp where the musical note starting point is located. Here, the musical note starting point may be obtained by an onset detector. Then, the beat point and the musical note starting point obtained in the two modes are unified, and the beat point and the musical note starting point are combined and deduplicated, thereby obtaining the candidate music point.

Step 203, generating one video clip for each music clip in the audio material using the image material so as to obtain a plurality of video clips, a music clip and a video clip, which correspond to each other, having a same duration.

In some embodiments, for each music clip in the audio material, the executive body can generate, for the music clip, one video clip with the same duration as the music clip based on the image material, so that the plurality of video clips can be obtained. As an example, suppose that the music material is divided into three music clips, and the durations of the three music clips are 1 second, 2 seconds, and 3 seconds, respectively. Then the durations of the video clips corresponding to the above music clips can also be 1 second, 2 seconds, and 3 seconds respectively.

As an example, the executive body can generate the plurality of video clips according to one image material. For example, assuming that the executive body obtains a 10-second image material and an 8-second audio material, and the executive body divides the audio material into three audio clips with the duration of 2 seconds, 2 seconds, and 4 seconds respectively, then the executive body can clip three different video clips with the duration of 2 seconds, 2 seconds, and 4 seconds respectively from the image material. As another example, the executive body can also generate one video clip according to one image material. For example, in the case where one image material is used to generate one video clip for one music clip, in response to the duration of the image material is larger than the duration of the music clip, a video clip with the duration of the music clip is clipped from the original image material, and in response to the duration of the image material is smaller than the duration of the music clip, the original image material is subjected to variable speed processing to lengthen the duration, and then the variable speed image material is used as the video clip, so that the duration of the video clip is equal to the duration of the music clip.

Step 204, splicing the plurality of video clips together according to the times when music clips respectively corresponding to the plurality of video clips appear in the audio material, and adding the audio material as a video audio track to obtain a synthesized video.

In some embodiments, the executive body of the method for generating a video can splice the video clips corresponding to the above-mentioned music clips together in turn according to the order in which the music clips appear in the audio material, and add the audio material to the audio track of the spliced video so as to obtain the synthesized video.

As an example, the above audio material can be divided into 3 clips in order according to the music points. For example, a clip A can be from 0 to 2 seconds, a clip B can be from 2 to 5 seconds, and a clip C can be from 5 to 10 seconds. The corresponding video clips are a clip a, a clip b and a clip c respectively. Then the spliced video can be represented as the abc. The above audio material is added to the audio track of the spliced video abc so as to obtain the synthesized video.

One of the above-mentioned embodiments of the present disclosure has the following beneficial effects: firstly, the audio material is acquired through the background music of the original video during the display process of the original video, and the image material is acquired; the music points of the audio material can be determined based on the acquired audio material, and the music points are used to divide the audio material into the plurality of audio clips. Then, the video clip for each music clip in the audio material is generated using the image material to obtain the plurality of video clips, and the music clip and the video clip, which correspond to each other, have the same duration. Finally, the video clips are spliced together according to the times when the music clips corresponding to the video clips appear in the audio material, and the audio material is added as a video track to obtain a synthesized video.

One of the above-mentioned embodiments of the present disclosure has the following beneficial effects: based on the acquired audio material and the image material, the video generation requirements for users can be obtained. Therefore, the user can be assisted in the video synthesis and the audio material adjustment based on the user's requirements. Thus, the processing duration of the user can be reduced, because the audio material and the image material meet the requirements of the user, so the obtained synthesized video is closer to the expected value of the user. Therefore, the present disclosure improves the user experience and provides convenience for the video synthesis of the users.

Figure 3:
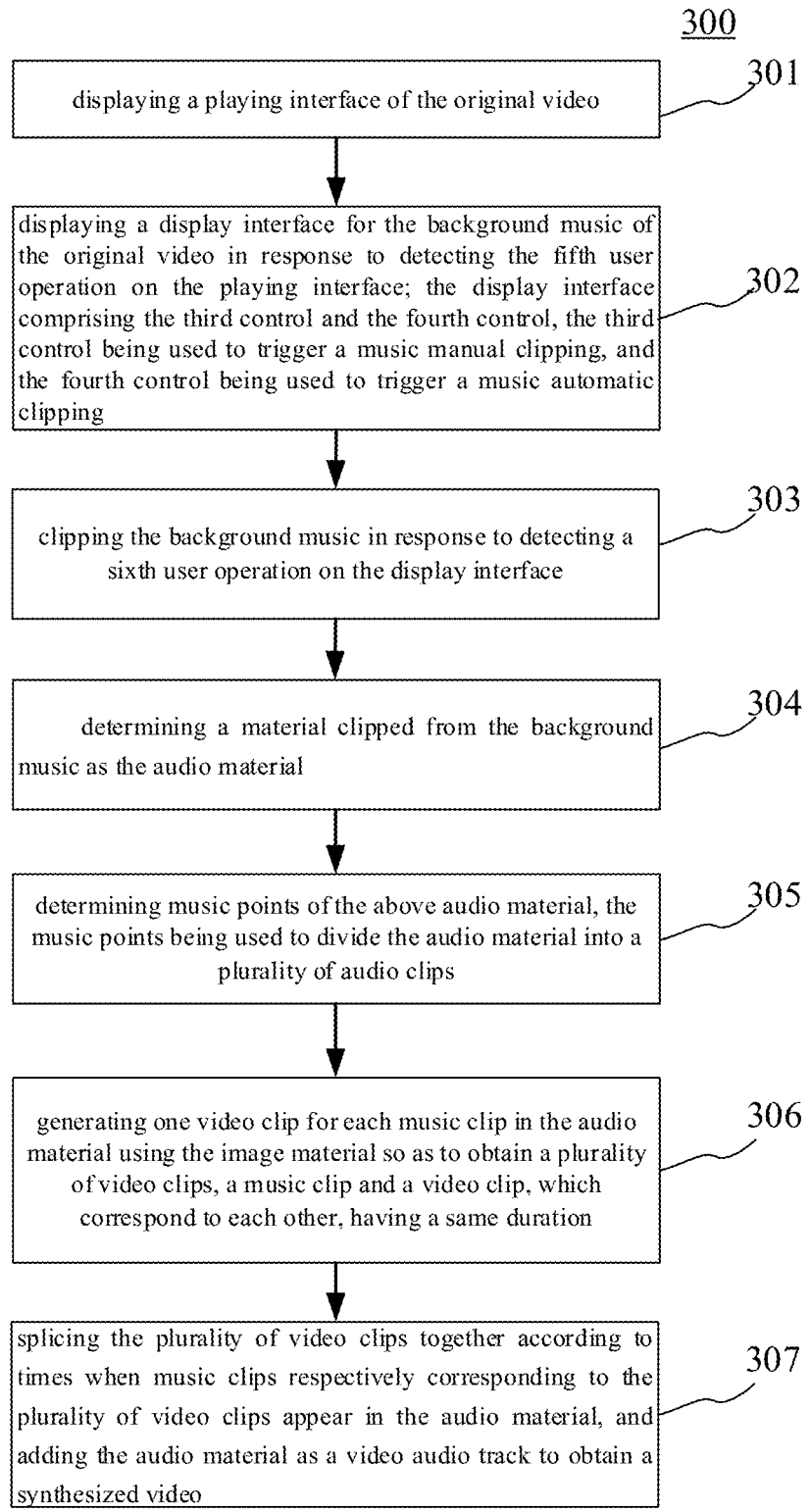
FIG. 3 is a flowchart of other embodiments of the method for generating a video according to the present disclosure.

With continued reference to FIG. 3, the flow 300 of other embodiments of the method for generating a video according to the present disclosure is illustrated. The method for generating a video comprises the following steps:

Step 301, displaying a playing interface of the original video.

In some embodiments, the executive body may display the playing interface of the original video.

Step 302, displaying a display interface for the background music of the original video in response to detecting the fifth user operation on the playing interface; the display interface comprising the third control and the fourth control, the third control being used to trigger a music manual clipping, and the fourth control being used to trigger a music automatic clipping.

In some embodiments, the executive body may display the display interface of the background music for the original video.

As an example, the executive body detects that the user clicks the identifier for the background music on the playing interface, and displays the display interface for the background music of the original video.

Step 303, clipping the background music in response to detecting a sixth user operation on the display interface.

In some embodiments, the executive body can detect the sixth user operation on the display interface and clip the background music in various ways. For example, the executive body can clip the background music according to the manual clipping operation. For example, the executive body can clip the background music according to the automatic clipping.

In some alternative implementations of some embodiments, clipping the background music in response to detecting the sixth user operation on the display interface, comprises: in the case where the seventh user operation is a user operation for the third control, displaying an operation interface for the music clipping; determining a clipping interval selected by a manual clipping operation from the background music in response to detecting the manual clipping operation for the background music on the operation interface for the music clipping; and clipping the background music according to the clipping interval. The third control is used to trigger the music manual clipping.

In some alternative implementations of some embodiments, clipping the background music comprises: in the case where the seventh user operation is a user operation for the fourth control, analyzing a clipping interval in the background music which is applicable for being used as the audio material according to an analysis algorithm for the audio material; and clipping the background music according to the clipping interval.

Step 304, determining a material clipped from the background music as the audio material.

In some embodiments, the executive body may determine the material clipped from the background music as the audio material for making a video.

Step 305, determining music points of the above audio material, the music points being used to divide the audio material into a plurality of audio clips.

Step 306, generating one video clip for each music clip in the audio material using the image material so as to obtain a plurality of video clips, a music clip and a video clip, which correspond to each other, having a same duration.

Step 307, splicing the plurality of video clips together according to times when music clips respectively corresponding to the plurality of video clips appear in the audio material, and adding the audio material as a video audio track to obtain a synthesized video.

In some embodiments, the specific implementations of steps 305-307 and the resulting technical effects can refer to steps 203-204 in those embodiments corresponding to FIG. 2, which may not be repeated here.

One of the above embodiments of the present disclosure has the following beneficial effects: by clipping the background music, various audio materials can be obtained, so as to better meet the requirements of the users. Furthermore, while obtaining various audio materials, various synthesized videos can also be obtained, thus enriching the diversity of the generated videos and improving the user experience.

Figure 4:
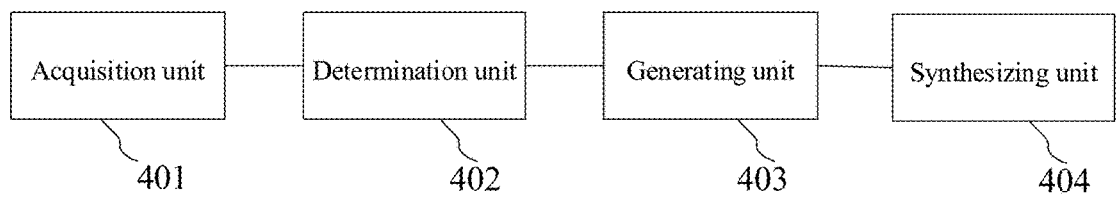
FIG. 4 is a structural schematic diagram of some embodiments of an apparatus for generating a video according to the present disclosure.

With further reference to FIG. 4, as an implementation of the methods of the above figures, the present disclosure provides some embodiments of an apparatus for generating a video. These apparatus embodiments correspond to those method embodiments described above in FIG. 2, and the apparatus can be specifically applied to various electronic devices.

As illustrated in FIG. 4, the apparatus 400 for generating a video in some embodiments includes: an acquisition unit 401, a determination unit 402, a generating unit 403, and a synthesizing unit 404. The acquisition unit 401 is configured to, during a display process of an original video, acquire an audio material through a background music of the original video, and acquire an image material. The determination unit 402 is configured to determine music points for the audio material, and the music points are used to divide the audio material into a plurality of audio clips. The generating unit 403 is configured to generate one video clip for each music clip in the audio material using the image material so as to obtain a plurality of video clips, and a music clip and a video clip, which correspond to each other, have a same duration. The synthesizing unit 404 is configured to splice the plurality of video clips together according to times when music clips respectively corresponding to the plurality of video clips appear in the audio material, and add the audio material as a video audio track to obtain a synthesized video.

In some embodiments, the acquisition unit 401 of the apparatus 400 for generating a video includes: a display sub-unit and an acquisition sub-unit. The display sub-unit is configured to display a playing interface for the original video. The acquisition sub-unit is configured to acquire the background music of the original video as the audio material in response to detecting a first user operation on the playing interface.

In some embodiments, the acquisition unit 401 of the apparatus 400 for generating a video further includes: a first module, a second module, a third module. The first module is configured to display a first display interface for the above background music in response to detecting the first user operation on the playing interface. The second module is configured to display a second display interface for the image material in response to detecting a second user operation on the first display interface. The third module is configured to acquire the image material based on a selection operation for the image material on the second display interface.

In some embodiments, the second module includes: a first sub-module and a second sub-module. The first sub-module is configured to display an image shooting interface in response to detecting a second user operation for the first display interface. The image shooting interface comprises the first control and the second control, the first control is used for triggering an image shooting, and the second control is used for triggering an image selection. The second sub-module is configured to display the second display interface for the image material in response to detecting a third user operation on the second control.

In some embodiments, the apparatus 400 for generating a video further comprises: an adjusting unit and a display unit. The adjusting unit is configured to adjust the synthesized video in response to detecting the adjusting operation by the user on the synthesized video. The display unit is configured to display the adjusted synthesized video.

Some embodiments of the present disclosure disclose an apparatus for generating a video that obtains a synthesized video through the acquired image material and the audio material. By adjusting the synthesized video, various synthesized videos can be obtained, thus enriching the diversity of the generated videos.

Figure 5:
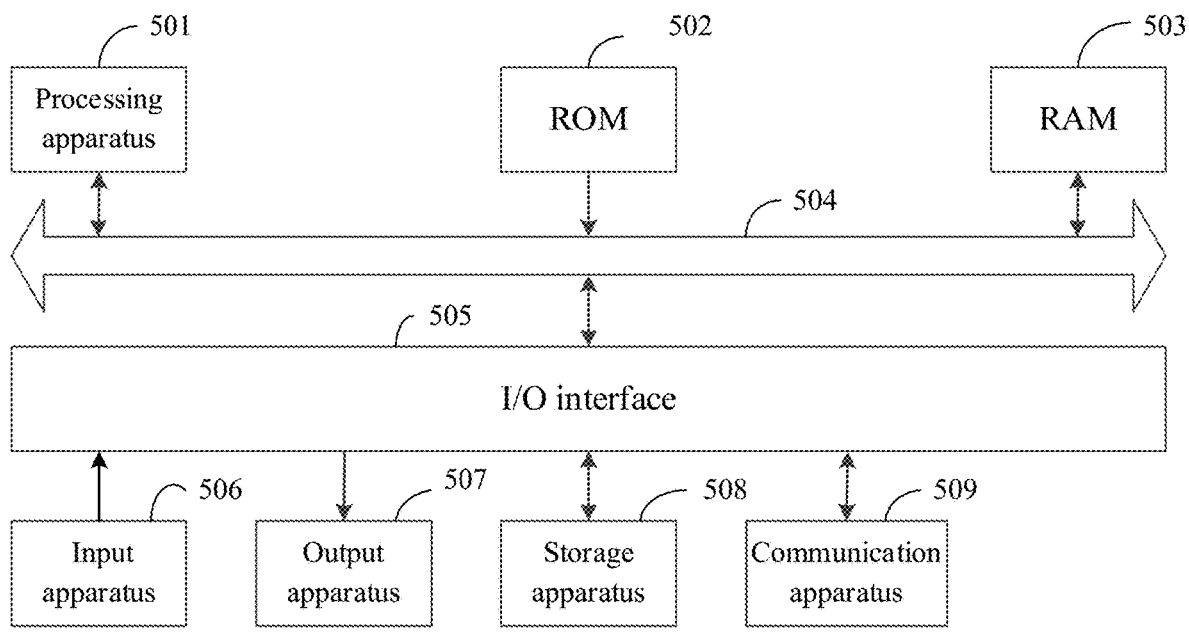
FIG. 5 is a structural schematic diagram of an electronic device applicable for implementing some embodiments of the present disclosure.

Referring next to FIG. 5, FIG. 5 illustrates a structural schematic diagram of an electronic device (e.g., the server in FIG. 1) 500 suitable for implementing some embodiments of the present disclosure. The terminal device according to some embodiments of the present disclosure may include, but not limited to, a mobile terminal, such as a mobile phone, a laptop, a digital broadcast receiver, a Personal Digital Assistant (PDA), a Portable Android Device (PAD), a Portable Multimedia Player (PMP), a vehicle-mounted terminal (e.g., a vehicle-mounted navigation terminal), etc., and a stationary terminal, such as a digital TV, a desktop computer, etc. The terminal device illustrated in FIG. 5 is only an example, and should not impose any limitation on the function and use scope of the embodiments of the present disclosure.

As illustrated in FIG. 5, the electronic device 500 may include a processing apparatus (e.g., a central processing unit, a graphics processor, etc.) 501, which may executes various appropriate actions and processing according to a program stored in a Read-Only Memory (ROM) 502 or a program loaded from a storage apparatus 508 into a Random Access Memory (RAM) 503. The RAM 503 further stores various programs and data required for operation of the electronic device 500. The processing apparatus 501, the ROM 502, and the RAM 503 are connected with each other through a bus 504. An input/output (I/O) interface 505 is also coupled to a bus 504.

Usually, apparatuses below may be coupled to an I/O interface 505: an input apparatus 506 including, for example, a touch screen, a touch pad, a keyboard, a mouse, a camera, a microphone, an accelerometer, a gyroscope, etc.; an output apparatus 507 including, for example, a Liquid Crystal Display (LCD), a speaker, a vibrator, etc.; a storage apparatus 508 including, for example, a magnetic tape, a hard disk, etc.; and a communication apparatus 509. The communication apparatus 509 may allow the electronic device 500 to perform wireless or wired communication with other device so as to exchange data. Although FIG. 5 illustrates the electronic device 500 having various apparatuses, it should be understood that, it is not required to implement or have all the apparatuses illustrated, and the electronic device 500 may alternatively implement or have more or fewer apparatuses. Each block illustrated in FIG. 5 may represent one apparatus, or may also represent a plurality of apparatuses as required.

Particularly, according to some embodiments of the present disclosure, the flows as described above with reference to the flow charts may be implemented as computer software programs. For example, some embodiments of the present disclosure include a computer program product, comprising a computer program carried on a computer-readable medium, the computer program containing program codes for executing the method illustrated in the flow chart. In such embodiments, the computer program may be downloaded and installed from the network via the communication apparatus 509, or installed from the storage apparatus 508, or installed from the ROM 502. When executed by the processing apparatus 501, the computer program executes the above-described functions limited in the methods according to some embodiments of the present disclosure.

It should be noted that, in some embodiments of the present disclosure, the above-described computer-readable medium may be a computer-readable signal medium or a computer-readable storage medium, or any combination of the above two. The computer-readable storage medium may be, for example, but not limited to, an electronic, magnetic, optical, electromagnetic, infrared, or semiconductor system, apparatus, or device, or any suitable combination of the above. More specific examples of the computer-readable storage medium may include, but not limited to: an electrical connection having one or more conductors, a portable computer diskette, a hard disk, a Random Access Memory (RAM), a Read-Only Memory (ROM); an Erasable Programmable Read-Only Memory (EPROM or Flash memory); an optical fiber, a Portable Compact Disc Read-Only Memory (CD-ROM); an optical storage apparatus; a magnetic storage apparatus; or any suitable combination of the above. In some embodiments of the present disclosure, a computer-readable storage medium may be any tangible medium that contains or stores a program that may be used by or in conjunction with an instruction executing system, an apparatus, or a device. Rather, in some embodiments of the present disclosure, the computer-readable signal medium may include a data signal propagated in baseband or as a portion of a carrier wave, which carries a computer-readable program code therein. Such propagated data signals may take a variety of forms, including but not limited to, electromagnetic signals, optical signals, or any suitable combination of the above. The computer-readable signal medium may also be any computer-readable medium other than a computer-readable storage medium; and the computer-readable signal medium may transmit, propagate, or transport programs for use by or in combination with the instruction executing system, the apparatus, or the device. The program code embodied on the computer-readable medium may be transmitted by using any suitable medium, including, but not limited to, an electrical wire, an optical cable, a Radio Frequency (RF), etc., or any suitable combination of the above.

In some implementation modes, the client and the server may communicate with any network protocol currently known or to be researched and developed in the future such as HyperText Transfer Protocol (HTTP), and may communicate (via a communication network) and interconnect with digital data in any form or medium. Examples of communication networks include a Local Area Network ("LAN"), a Wide Area Network ("WAN"), the Internet, and an end-to-end network (e.g., an ad hoc end-to-end network), as well as any network currently known or to be researched and developed in the future.

The above-described computer-readable medium may be included in the above-described electronic device; or may also exist alone without being assembled into the electronic device. The above-described computer-readable medium carries one or more programs, and when the above-described one or more programs are executed by the electronic device, the electronic device, during the display process of an original video, acquires the audio material through background music of the original video, and acquires the image material; determines music points for the audio material; generates one video clip for each music clip in the audio material using the image material so as to obtain a plurality of video clips; and splices the plurality of video clips together according to times when music clips respectively corresponding to the plurality of video clips appear in the audio material, and adding the audio material as a video audio track to obtain a synthesized video. The music points are used to divide the audio material into a plurality of audio clips, and a music clip and a video clip, which correspond to each other, have a same duration.

The computer program code for executing the operations according to some embodiments of the present disclosure may be written in one or more programming languages or a combination thereof; the above-described programming languages include object-oriented programming languages, such as Java, Smalltalk, C++, and also include conventional procedural programming languages such as "C" language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a Local Area Network (LAN) or a Wide Area Network (WAN), or the connection may be made to an external computer (for example, through the Internet using an Internet Service Provider).

The flow chart and block diagrams in the accompanying drawings illustrate the architecture, functionality, and operation of possible implementations of systems, methods, and computer program products according to various embodiments of the present invention. In this regard, each block in the flow chart or block diagrams may represent a module, clip, or portion of instructions, which comprises one or more executable instructions for implementing the specified logical function(s). It should also be noted that, in some alternative implementations, the functions noted in the block may occur out of the order noted in the accompanying drawings. For example, two blocks illustrated in succession may, in fact, be executed substantially concurrently, or the blocks may sometimes be executed in the reverse order, depending upon the functionality involved. It should also be noted that, each block of the block diagrams and/or flow charts, and combinations of blocks in the block diagrams and/or flow charts, may be implemented by special purpose hardware-based systems that execute the specified functions, or may also be implemented by a combination of special purpose hardware and computer instructions.

The units as described in some embodiments of the present disclosure may be implemented by means of software, or may also be implemented by means of hardware. The described unit may also be provided in a processor, which, for example, may be described as: a processor, including an acquiring unit, an analyzing unit and a display unit. The names of these units do not constitute a limitation on the units per se in some cases, for example, the acquiring unit may also be described as "a unit for acquiring an audio material".

The functions described herein above may be executed, at least partially, by one or more hardware logic components. For example, without limitation, available exemplary types of hardware logic components include: a Field Programmable Gate Array (FPGA), an Application Specific Integrated Circuit (ASIC), an Application Specific Standard Product (ASSP), a System on Chip (SOC), a Complex Programmable Logical Device (CPLD), etc.

According to one or more embodiments of the present disclosure, the method for generating a video is provided.

The method includes: during a display process of an original video, acquiring audio material through background music of the original video, and acquiring image material; determining music points for the audio material; generating one video clip for each music clip in the audio material using the image material so as to obtain a plurality of video clips; and splicing the plurality of video clips together according to times when music clips respectively corresponding to the plurality of video clips appear in the audio material, and adding the audio material as a video audio track to obtain a synthesized video. The music points are used to divide the audio material into a plurality of audio clips, and a music clip and a video clip, which correspond to each other, have a same duration.

According to one or more embodiments of the present disclosure, during the display process of the original video, acquiring the audio material through the background music of the original video, comprises: displaying a playing interface for the original video; and acquiring the background music of the original video as the audio material in response to detecting a first user operation on the playing interface.

According to one or more embodiments of the present disclosure, acquiring the image material comprises: displaying a first display interface for the background music in response to detecting the first user operation on the playing interface; displaying a second display interface for the image material in response to detecting a second user operation on the first display interface; and acquiring the image material based on a selection operation for the image material on the second display interface.

According to one or more embodiments of the present disclosure, displaying the second display interface for the image material in response to detecting the second user operation on the first display interface, comprises: displaying an image shooting interface in response to detecting the second user operation on the first display interface; and displaying the second display interface for the image material in response to detecting a third user operation on the second control. The image shooting interface comprises the first control and the second control, the first control is used to trigger an image shooting, and the second control is used to trigger an image selection.

According to one or more embodiments of the present disclosure, acquiring the image material comprises: displaying a first display interface for the background music in response to detecting the first user operation on the playing interface; displaying an image shooting interface in response to detecting a second user operation on the first display interface; and in response to detecting a fourth user operation on the first control, calling a shooting element to shoot an image so as to obtain the image material. The image shooting interface comprises the first control, and the first control is used to trigger an image shooting According to one or more embodiments of the present disclosure, during the display process of the original video, acquiring the audio material through the background music of the original video, comprises: displaying a playing interface for the original video; displaying a display interface for the background music of the original video in response to detecting a fifth user operation on the playing interface; clipping the background music in response to detecting a sixth user operation on the display interface; and determining material clipped from the background music as the audio material. The display interface comprises the third control and the fourth control, the third control is used to trigger a music manual clipping, and the fourth control is used to trigger a music automatic clipping.

According to one or more embodiments of the present disclosure, clipping the background music in response to detecting the sixth user operation on the display interface, comprises: in the case where a seventh user operation is a user operation for the third control, displaying an operation interface for music clipping; determining a clipping interval selected by a manual clipping operation from the background music in response to detecting the manual clipping operation for the background music on an operation interface for music clipping; and clipping the background music according to the clipping interval. The third control is used to trigger music manual clipping.

According to one or more embodiments of the present disclosure, clipping the background music comprises: in the case where the seventh user operation is a user operation for the fourth control, analyzing a clipping interval in the background music which is applicable for being used as the audio material according to an analysis algorithm for the audio material; and clipping the background music according to the clipping interval.

According to one or more embodiments of the present disclosure, the apparatus includes an acquisition unit, a determination unit, a generating unit, and a synthesizing unit. The acquisition unit is configured to, during a display process of an original video, acquire an audio material through a background music of the original video, and acquire an image material. The determination unit is configured to determine music points for the audio material, and the music points are used to divide the audio material into a plurality of audio clips. The generating unit is configured to generate one video clip for each music clip in the audio material using the image material so as to obtain a plurality of video clips, and a music clip and a video clip, which correspond to each other, have a same duration. The synthesizing unit is configured to splice the plurality of video clips together according to times at which music clips respectively corresponding to the plurality of video clips appear in the audio material, and add the audio material as a video audio track to obtain a synthesized video.

According to one or more embodiments of the present disclosure, the apparatus further includes a display sub-unit and an acquisition sub-unit. The display sub-unit is configured to display a playing interface for the original video. The acquisition sub-unit is configured to acquire the background music of the original video as the audio material in response to detecting a first user operation on the playing interface.

According to one or more embodiments of the present disclosure, an electronic device is provided, which includes one or more processors and a storage apparatus having one or more programs stored thereon. In a case where one or more programs are executed by the one or more processors, the one or more programs cause the one or more processors to execute the method according to any one of the above-described embodiments.

According to one or more embodiments of the present disclosure, there is provided a computer-readable medium, having a computer program stored thereon. In a case where the computer program is executed by a processor, the computer program executes the method according to any one of the above-described embodiments.

According to one or more embodiments of the present disclosure, there is provided a computer program, comprising program code. In a case where the computer program is executed by a computer, the program code executes the method according to any one of the above-described embodiments.

The above description is merely description of some preferred embodiments of the present disclosure and technical principles applied thereto. Those skilled in the art should understand that, the scope of invention involved in the embodiments of the present disclosure is not limited to the technical solution formed by the specific combination of the above-described technical features, and should also cover, without departing from the above-described inventive concept, other technical solutions formed by any combination of the above-described technical features or equivalent features thereof. For example, a technical solution is formed by mutually replacing the above-described features with the technical features disclosed (but not limited to) in the embodiments of the present disclosure with similar functions.

The invention claimed is:

1. A method for generating a video, comprising:
displaying a playing interface for an original video;
during a display process of the original video, acquiring a background music from the original video as an audio material in response to detecting a first user operation of selecting an identifier indicating the background music during the display process of the original video, wherein music points of the audio material is determined for dividing the audio material into a plurality of music clips;
in response to acquiring the audio material, displaying an interface for selecting one of two controls for acquiring an image material, the two controls configured to trigger image shooting and image selection, respectively;
in response to acquiring the image material, generating one video clip for each music clip in the audio material using the image material so as to obtain a plurality of video clips, wherein a music clip and a video clip, which correspond to each other, have a same duration; and
splicing the plurality of video clips together according to times when music clips respectively corresponding to the plurality of video clips appear in the audio material, and adding the audio material as a video audio track to obtain a synthesized video.

2. The method according to claim 1, wherein acquiring the image material comprises:
displaying a first display interface for the background music in response to detecting the first user operation on the playing interface;
displaying a second display interface for the image material in response to detecting a second user operation on the first display interface; and
acquiring the image material based on a selection operation for the image material on the second display interface.

3. The method according to claim 2, wherein displaying the second display interface for the image material in response to detecting the second user operation on the first display interface, comprises:
displaying an image shooting interface in response to detecting the second user operation on the first display interface, wherein the image shooting interface comprises a first control and a second control, the first control is used to trigger an image shooting, and the second control is used to trigger an image selection; and
displaying the second display interface for the image material in response to detecting a third user operation on the second control.

4. The method according to claim 1, wherein acquiring the image material comprises:
displaying a first display interface for the background music in response to detecting the first user operation on the playing interface;
displaying an image shooting interface in response to detecting a second user operation on the first display interface, wherein the image shooting interface comprises a first control, and the first control is used to trigger an image shooting; and
in response to detecting a fourth user operation on the first control, calling a shooting element to shoot an image so as to obtain the image material.

5. The method according to claim 1, wherein, during the display process of the original video, acquiring the background music from the original video as the audio material comprises:
displaying a display interface for the background music of the original video in response to detecting a fifth user operation on the playing interface, wherein the display interface comprises a third control and a fourth control, the third control is used to trigger a music manual clipping, and the fourth control is used to trigger a music automatic clipping;
clipping the background music in response to detecting a sixth user operation on the display interface; and
determining a material clipped from the background music as the audio material.

6. The method according to claim 5, wherein clipping the background music in response to detecting the sixth user operation on the display interface, comprises:
in a case where a seventh user operation is a user operation for the third control, displaying an operation interface for a music clipping, wherein the third control is used to trigger the music manual clipping;
determining a clipping interval selected by a manual clipping operation from the background music in response to detecting the manual clipping operation for the background music on the operation interface for the music clipping; and
clipping the background music according to the clipping interval.

7. The method according to claim 5, wherein clipping the background music, comprises: in a case where a seventh user operation is a user operation for the fourth control, analyzing a clipping interval in the background music which is applicable for being used as the audio material according to an analysis algorithm for the audio material; and
clipping the background music according to the clipping interval.

8. An apparatus for generating a video, comprising:
at least one processor; and
at least one memory communicatively coupled to the at least one processor and storing instructions that upon execution by the at least one processor cause the apparatus to:
display a playing interface for an original video;
during a display process of the original video, acquire a background music from the original video as an audio material in response to detecting a first user operation of selecting an identifier indicating the background music during the display process of the original video, wherein music points of the audio material is determined for dividing the audio material into a plurality of music clips;
in response to acquiring the audio material, display an interface for selecting one of two controls for acquiring an image material, the two controls configured to trigger image shooting and image selection, respectively;

in response to acquiring the image material, generate one video clip for each music clip in the audio material using the image material so as to obtain a plurality of video clips, wherein a music clip and a video clip, which correspond to each other, have a same duration; and splice the plurality of video clips together according to times when music clips respectively corresponding to the plurality of video clips appear in the audio material, and add the audio material as a video audio track to obtain a synthesized video.

9. The apparatus according to claim 8, wherein the at least one memory further stores instructions that upon execution by the at least one processor cause the apparatus to:

display a first display interface for the background music in response to detecting the first user operation on the playing interface;

display a second display interface for the image material in response to detecting a second user operation on the first display interface; and acquire the image material based on a selection operation for the image material on the second display interface.

10. The apparatus according to claim 9, wherein the at least one memory further stores instructions that upon execution by the at least one processor cause the apparatus to:

display an image shooting interface in response to detecting the second user operation on the first display interface, wherein the image shooting interface comprises a first control and a second control, the first control is used to trigger an image shooting, and the second control is used to trigger an image selection; and display the second display interface for the image material in response to detecting a third user operation on the second control.

11. The apparatus according to claim 8, wherein the at least one memory further stores instructions that upon execution by the at least one processor cause the apparatus to:

adjust the synthesized video in response to detecting an adjusting operation by a user on the synthesized video; display the adjusted synthesized video.

12. The apparatus according to claim 8, wherein the at least one memory further stores instructions that upon execution by the at least one processor cause the apparatus to:

display a first display interface for the background music in response to detecting the first user operation on the playing interface;

display an image shooting interface in response to detecting a second user operation on the first display interface, wherein the image shooting interface comprises a first control, and the first control is used to trigger an image shooting; and in response to detecting a fourth user operation on the first control, call a shooting element to shoot an image so as to obtain the image material.

13. The apparatus according to claim 8, wherein the at least one memory further stores instructions that upon execution by the at least one processor cause the apparatus to:

display a display interface for the background music of the original video in response to detecting a fifth user operation on the playing interface, wherein the display interface comprises a third control and a fourth control, the third control is used to trigger a music manual clipping, and the fourth control is used to trigger a music automatic clipping;

clip the background music in response to detecting a sixth user operation on the display interface; and determine a material clipped from the background music as the audio material.

14. The apparatus according to claim 13, wherein the at least one memory further stores instructions that upon execution by the at least one processor cause the apparatus to:

in response to determining that a seventh user operation is a user operation for the third control, display an operation interface for an music clipping, wherein the third control is used to trigger the music manual clipping;

determine a clipping interval selected by a manual clipping operation from the background music in response to detecting the manual clipping operation for the background music on the operation interface for the music clipping; and clip the background music according to the clipping interval.

15. The apparatus according to claim 13, wherein the at least one memory further stores instructions that upon execution by the at least one processor cause the apparatus to:

in response to determining that a seventh user operation is a user operation for the fourth control, analyze a clipping interval in the background music which is applicable for being used as the audio material according to an analysis algorithm for the audio material; and clip the background music according to the clipping interval.

16. A non-transitory computer readable storage medium, having a computer program stored thereon, wherein the computer program upon execution by a processor, causes the processor to implement operations comprising:

displaying a playing interface for an original video;

during a display process of the original video, acquiring a background music from the original video as an audio material in response to detecting a first user operation of selecting an identifier indicating the background music during the display process of the original video, wherein music points of the audio material is determined for dividing the audio material into a plurality of music clips;

in response to acquiring the audio material, displaying an interface for selecting one of two controls for acquiring an image material, the two controls configured to trigger image shooting and image selection, respectively;

in response to acquiring the image material, generating one video clip for each music clip in the audio material using the image material so as to obtain a plurality of video clips, wherein a music clip and a video clip, which correspond to each other, have a same duration; and splicing the plurality of video clips together according to times when music clips respectively corresponding to the plurality of video clips appear in the audio material, and adding the audio material as a video audio track to obtain a synthesized video.

* * * * *